(12) United States Patent
Hoogzaad

(10) Patent No.: US 8,030,861 B2
(45) Date of Patent: Oct. 4, 2011

(54) METHOD FOR CONTROLLING A DECELERATION PROCESS OF A DC MOTOR AND CONTROLLER

(75) Inventor: Gian Hoogzaad, Mook (NL)

(73) Assignee: NXP B.V., Eindhoven (NL)

( * ) Notice: Subject to any disclaimer, the term of this patent is extended or adjusted under 35 U.S.C. 154(b) by 466 days.

(21) Appl. No.: 12/307,283

(22) PCT Filed: Jul. 3, 2007

(86) PCT No.: PCT/IB2007/052574
§ 371 (c)(1),
(2), (4) Date: Jan. 2, 2009

(87) PCT Pub. No.: WO2008/004178
PCT Pub. Date: Jan. 10, 2008

(65) Prior Publication Data
US 2009/0315490 A1     Dec. 24, 2009

(30) Foreign Application Priority Data

Jul. 4, 2006 (EP) .................................. 06116581

(51) Int. Cl.
*H02P 3/14* (2006.01)
*H02P 23/00* (2006.01)

(52) U.S. Cl. .......... 318/376; 318/811; 318/599; 361/30; 361/91.1

(58) Field of Classification Search .................. 318/700, 318/400.01, 400.22, 400.26, 400.3, 400.34, 318/256, 258, 280, 362, 375, 376, 377, 599, 318/811; 361/23, 30, 84, 90, 91.1, 92
See application file for complete search history.

(56) References Cited

U.S. PATENT DOCUMENTS 4,544,868 A * 10/1985 Murty ...................... 318/400.11
4,622,628 A * 11/1986 Murasaki et al. ............... 363/37
(Continued)

FOREIGN PATENT DOCUMENTS

EP          0991177 A2       4/2000
(Continued)

*Primary Examiner* — Eduardo Colon Santana

(57) ABSTRACT

The invention is directed to a method for controlling a deceleration process of a DC motor (20), wherein the DC motor (20) is driven by a bridge driver (18) coupled to a power supply (12) intended to provide a supply voltage VDD at a power supply output (14), the method comprising the following steps: applying a deceleration PWM signal to the bridge driver (18) for decelerating the DC motor (20), and controlling the bridge driver (18) such that a motor-induced back current is reduced, if the voltage at the power supply output (14) exceeds a voltage threshold which is higher than VDD. In accordance with the invention the step of controlling the bridge driver (18) such that a motor-induced back current is reduced, if the voltage at the power supply output (14) exceeds a voltage threshold which is higher than VDD comprises: if the voltage at the power supply output exceeds the voltage threshold, changing stepwise the pulse width of the deceleration PWM signal in a first direction until the voltage at the power supply (14) output reaches or falls below the voltage threshold, and then, if the voltage at the power supply output (14) has fallen below the voltage threshold, changing stepwise the pulse width of the deceleration PWM signal in a second direction opposite to the first direction until the voltage at the power supply output (14) again reaches or exceeds the voltage threshold. The invention is also directed to a controller suitable to carry out the above method.

8 Claims, 4 Drawing Sheets

U.S. PATENT DOCUMENTS

| | | | |
|---|---|---|---|
| 5,513,058 A * | 4/1996 | Hollenbeck | 361/36 |
| 5,861,724 A * | 1/1999 | Ackerson | 318/376 |
| 5,932,979 A * | 8/1999 | Sun | 318/400.23 |
| 6,163,126 A * | 12/2000 | Kojima et al. | 318/685 |
| 6,222,334 B1 | 4/2001 | Tamagawa et al. | |
| 6,445,879 B1 | 9/2002 | Youn et al. | |
| 6,949,906 B2 | 9/2005 | Boscolo et al. | |
| 7,294,989 B2 * | 11/2007 | Saren | 318/805 |
| 2009/0284193 A1* | 11/2009 | Hoogzaad | 318/376 |

FOREIGN PATENT DOCUMENTS

| | | | |
|---|---|---|---|
| JP | 56035699 A * | 4/1981 | |
| JP | 61049695 A * | 3/1986 | |
| JP | 61150682 A | 7/1986 | |
| JP | 09247978 A | 9/1997 | |
| JP | 2001333587 A | 11/2001 | |
| JP | 2005198441 A | 7/2005 | |
| JP | 2005198442 A | 7/2005 | |
| KR | 20020068740 A | 8/2002 | |

* cited by examiner

METHOD FOR CONTROLLING A DECELERATION PROCESS OF A DC MOTOR AND CONTROLLER

FIELD OF THE INVENTION

The present invention relates to a method for controlling a deceleration process of a DC motor, wherein the DC motor is driven by a bridge driver coupled to a power supply intended to provide a supply voltage VDD at a power supply output, the method comprising the following steps: applying a deceleration PWM signal to the bridge driver for decelerating the DC motor, and controlling the bridge driver such that a motor-induced back current is reduced, if the voltage at the power supply output exceeds a voltage threshold which is higher than VDD.

Furthermore, the invention is directed to a controller for controlling a deceleration process of a DC motor which is driven by a bridge driver coupled to a power supply intended to provide a supply voltage VDD at a power supply output, the controller comprising: means for applying a deceleration PWM signal to the bridge driver for decelerating the DC motor, and means for controlling the bridge driver such that the motor-induced back current is reduced, if the voltage at the power supply output exceeds a voltage threshold which is higher than VDD.

BACKGROUND OF THE INVENTION

For example, DC brushless spindle motors are used in several applications, amongst others in optical and magnetic disc drives to rotate the storage medium. Other application fields are, for example, VCRs, shavers, fans, blowers and robotics. Braking these motors can be done electronically by driving the motor in such a way that the motor current reverses polarity relative to forward rotation. Since during deceleration the motor also acts as a generator, braking regimes are possible where a net current is delivered back to the power supply. Mechanical energy present in the inertia of the rotor is recuperated to electrical energy for the supply battery or capacitor. Using this regenerative braking regime yields a green and power-efficient motor drive system.

One known problem of regenerative braking is the possibility of over-voltages on the power supply when the power supply cannot deal with negative currents. Usually this is the case since asymmetric linear or switched-mode controllers are used to regulate the power supply voltage. Consequently, the power supply decoupling capacitor which is usually provided has to deal with these negative motor-induced back currents and given the large amount of energy in the motor dangerous over-voltages can occur. A known method to overcome these over-voltages is to use a Zener diode protection or an on-chip active clamp. This involves extra hardware cost since these devices need to be able to deal with considerable power dissipation (e. g. 4W for optical disc drives). To overcome these problems it is for example known from U.S. Pat. No. 6,949,906 B2, which discloses a method and a controller of the type mentioned at the beginning, to either short circuit or set into a high impedance mode the windings of a DC motor for a predetermined time interval, if a dangerous condition is detected during the deceleration process of the DC motor, for example an over-voltage at the power supply output. If the windings are short circuited, energy is dissipated because of friction and because the back-EMF of the motor results in current through the winding resistance. If the windings of the motor are set into a high impedance mode by opening the winding connections, energy is dissipated by friction only. In both cases the regenerative braking or deceleration process is interrupted for the predetermined time interval, and this may constitute a waste of energy.

It is the object of the invention to further develop the methods and controllers of the type mentioned at the beginning such that the waste of energy discussed above is avoided.

SUMMARY OF THE INVENTION

In accordance with a first aspect of the invention this object is solved by a method of the type mentioned at the beginning, wherein the step of controlling the bridge driver such that a motor-induced back current is reduced, if the voltage at the power supply output exceeds a voltage threshold which is higher than VDD comprises: if the voltage at the power supply output exceeds the voltage threshold, changing stepwise the pulse width of the deceleration PWM signal in a first direction until the voltage at the power supply output reaches or falls below the voltage threshold, and then, if the voltage at the power supply output has fallen below the voltage threshold, changing stepwise the pulse width of the deceleration PWM signal in a second direction opposite to the first direction until the voltage at the power supply output again reaches or exceeds the voltage threshold. With this solution the regenerative braking process is not necessarily interrupted if an over-voltage occurs. Such an interruption may be necessary in some cases, but in accordance with the invention it is first tried to alter the conditions such that the dangerous situation is terminated while the regenerative deceleration process is maintained. As regards the stepwise change of the pulse width, both control directions can be implemented by either allowing an increasing PWM or decreasing PWM with up/down steps. This is due to the fact that there exists a parabolic dependency between the motor-induced back current and duty cycle PWM, as will be discussed in connection with FIG. 2 below. Since it is not necessary in many cases to completely interrupt the regenerative deceleration process, a waste of energy is avoided.

For the method in accordance with the invention it is preferred that the voltage threshold is higher than VDD. For example, If VDD is equal to 12 V, then the voltage threshold can be selected to be equal to 15 V. In general, the selection of the voltage threshold will depend on the sensitivity of any components that might be damaged by an over-voltage at the power supply output.

With preferred embodiments of the method in accordance with the invention, the pulse width of the deceleration PWM signal is kept constant, if the voltage at the power supply output is equal to the voltage threshold. Thereby, at least in some cases and for a certain time interval a steady state can be obtained which is the optimal tradeoff as regards energy regeneration and voltage increase.

In general, for recycling the kinetic energy stored in the rotating DC motor, the pulse width of the PWM deceleration signal has to be selected such that the DC motor current experiences a change of sign compared to an acceleration process of the DC motor.

In accordance with a second aspect of the invention the above object is solved by a controller of the type mentioned at the beginning, wherein the means for controlling the bridge driver such that the motor-induced back current is reduced are adapted to operate as follows: if the voltage at the power supply output exceeds the voltage threshold, changing stepwise the pulse width of the deceleration PWM signal in a first direction until the voltage at the power supply output reaches or falls below the voltage threshold, and then, if the voltage at the power supply output has fallen below the voltage threshold, changing stepwise the pulse width of the deceleration PWM signal in a second direction opposite to the first direction until the voltage at the power supply output again reaches or exceeds the voltage threshold. Also with this solution a complete interruption of the regenerative deceleration conditions and therefore a waste of energy can be avoided. The means for controlling the bridge driver can, for example, comprise a comparator which compares the voltage at the power supply output with the voltage threshold. The output signal of the comparator preferably is sampled by an up/down filter which controls a pulse width modifier adapted to increase or decrease the pulse width of the PWM deceleration signal supplied thereto and to feed the modified signal to the bridge driver. In general, the characteristics and advantages discussed above in connection with the method in accordance with the invention are also achieved with the controller in accordance with the invention. Therefore, to avoid repetitions, reference is made to the above description. The same applies to the preferred embodiments of the controller in accordance with the invention discussed in the following.

Also for the controller in accordance with the invention it is preferred that the voltage threshold is higher than VDD, as discussed above.

For the controller in accordance with the invention it is further preferred that the means for controlling the bridge driver such that the motor-induced back current is reduced are adapted to keep the pulse width of the deceleration PWM signal constant, if the voltage at the power supply output is equal to the voltage threshold. As mentioned above, at least in some cases a steady state can be reached temporarily.

As also mentioned above, to perform a regenerative deceleration it is in general necessary that the means for applying a deceleration PWM signal to the bridge driver are adapted to select the pulse width of the PWM deceleration signal such that the DC motor current experiences a change of sign compared to an acceleration process of the DC motor.

All the components and means mentioned herein can be realized by analog and/or digital circuitry well known to the person skilled in the art. The use of microcontrollers, microprocessors and suitable software is also within the scope of the invention.

These and other aspects of the invention will be apparent from and elucidated with reference to the embodiments described hereinafter.

DESCRIPTION OF PREFERRED EMBODIMENTS

Figure 1A:
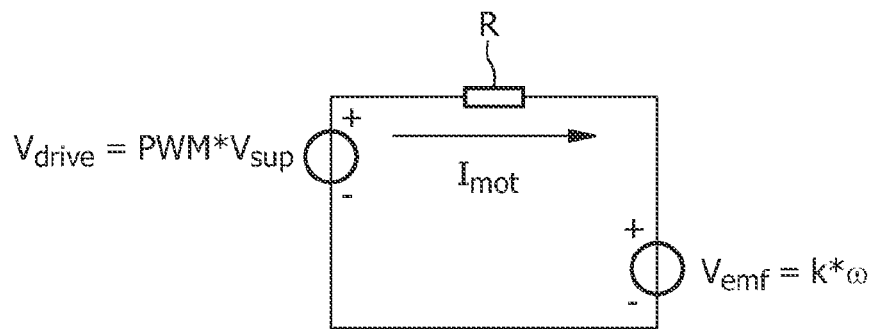
FIGS. 1a to 1c show a DC motor driver and DC motor model for three different modes of operation.
Figure 1B:
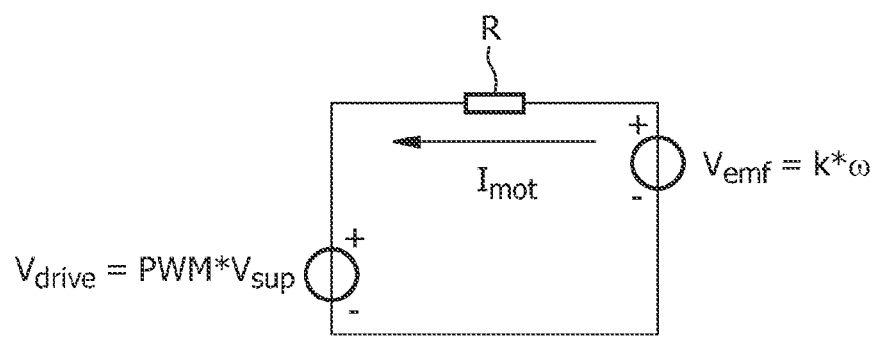
Figure 1C:
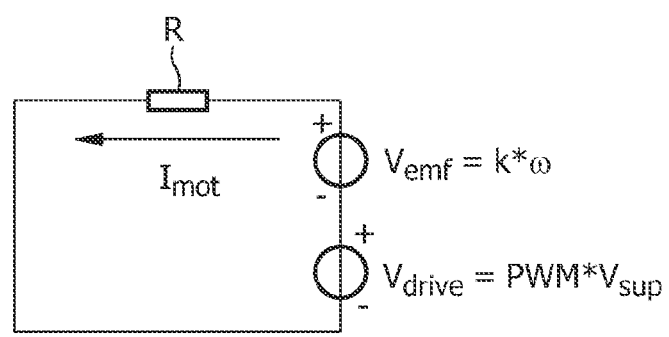

FIGS. 1a to 1c show a DC motor driver and DC motor model for three different modes of operation. It should be clear for the person skilled in the art that the motor model in accordance with FIGS. 1a to 1c is simplified. For example, if the motor is of the three-phase brushless type, the motor comprises three windings and the driving of these windings performed by a suitable bridge driver comprises several commutation phases for accelerating and/or decelerating the motor. As may be seen the model comprises two voltage sources $V_{drive}$ and $V_{emf}$ as well as a Resistor R. The drive voltage $V_{drive}$ is the output of a switching bridge with duty cycle PWM, i.e. $V_{drive}=PWM*V_{sup}$, wherein $V_{sup}$ is the supply voltage of the bridge driver. The back-EMF voltage of the motor is $V_{emf}=k*\omega$, wherein k is the motor constant and $\omega$ is the rotational frequency of the motor. The resistance R constitutes the total of switch resistance, the motor (winding) resistance and the wiring resistance of the connection from, for example, a motor driver IC to the motor.

FIG. 1a illustrates an acceleration process of the DC motor. In this case the drive voltage $V_{drive}$ is larger than the back-EMF voltage $V_{emf}$. Furthermore, the motor current $I_{mot}$ and the supply current $I_{sup}$ are positive, wherein $I_{sup}=PWM*I_{mot}$.

FIG. 1b illustrates a regenerative deceleration or braking process in accordance with the topic of the invention. In accordance with FIG. 1b a positive drive voltage $V_{drive}$ is used. $V_{drive}$ is smaller than the back-EMF voltage $V_{emf}$ and both the motor current $I_{mot}$ and the supply current $I_{sup}$ are negative, so that the supply current corresponds to the motor-induced back current.

FIG. 1c shows a deceleration or braking process using a negative drive voltage $V_{drive}$. Defacto $V_{drive}$ in this case is superimposed on the back-EMF voltage $V_{emf}$, wherein the motor current $I_{mot}$ is negative (still braking) and the supply current $I_{sup}$ is positive. The case where the superimposed drive voltage $V_{drive}$ is zero is known as short-circuit braking.

The above situations can be covered by the following formulas:

$$I_{mot}=(V_{drive}-V_{emf})/R=(PWM*V_{sup}-V_{emf})/R, \text{ and}$$

$$I_{sup}=PWM*I_{mot}=PWM*(PWM*V_{sup}-V_{emf})/R,$$

where PWM ranges from −100% to +100%.

Figure 2:
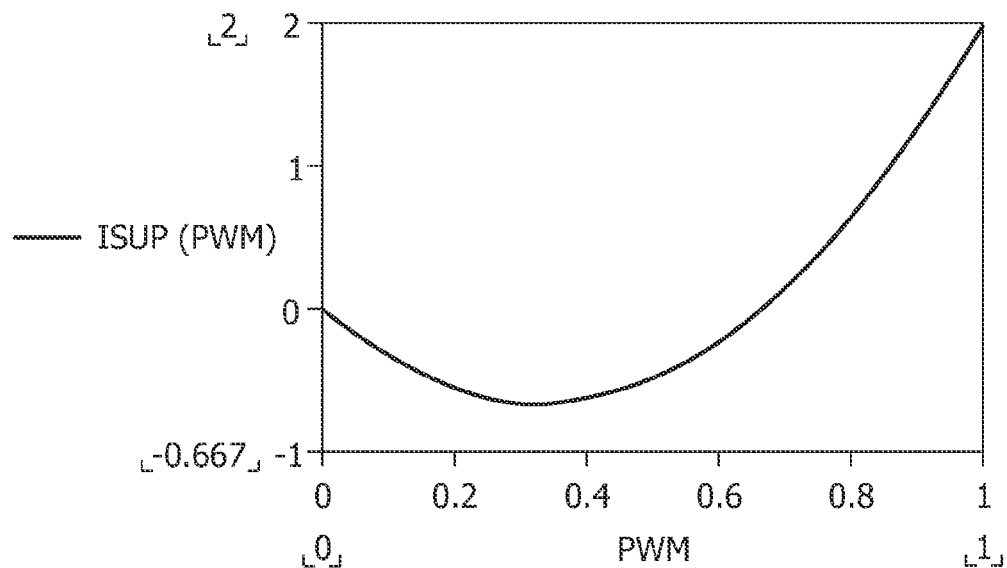
FIG. 2 shows an exemplary graph illustrating the dependency between the supply current and different PWM duty cycles.

It can be seen from FIG. 2 that the supply current $I_{sup}$ has a parabolic dependence on the duty cycle PWM, wherein negative values of $I_{sup}$ represent a motor-induced back current. FIG. 2 illustrates the following example: $V_{sup}$=12V, $V_{emf}$=8V, R=2 Ohm and positive PWM. In this case for duty cycles between 0 and $V_{emf}/V_{sup}$=⅔ there are negative supply currents and consequently there is regenerative braking. A maximum (negative) regenerated supply current exists at $V_{emf}/(2*V_{sup})$=⅓ with a supply current $I_{sup}$=−2*$V_{emf}/(4*Vsup*R)$. To make a regenerated braking control scheme by measuring the supply voltage $V_{sup}$ at the power supply output and controlling the PWM content, with a PWM-to-$I_{sup}$ transfer characteristic as above, two control directions are possible. When the supply voltage $V_{sup}$ exceeds the designed clamp value because of the negative regenerative supply current $I_{sup}$, then this supply current $I_{sup}$ should be decreased, and can be decreased in two ways: control to smaller PWM in the direction of PWM=0% which when PWM=0 is reached coincides with short-circuit braking ($I_{mot}=V_{emf}/R$), or control in the direction to larger PWM, i.e. in the direction of PWM=$V_{emf}/V_{sup}$ which in the case of $I_{mot}$=0 coincides with a high-impedant braking.

Figure 3:
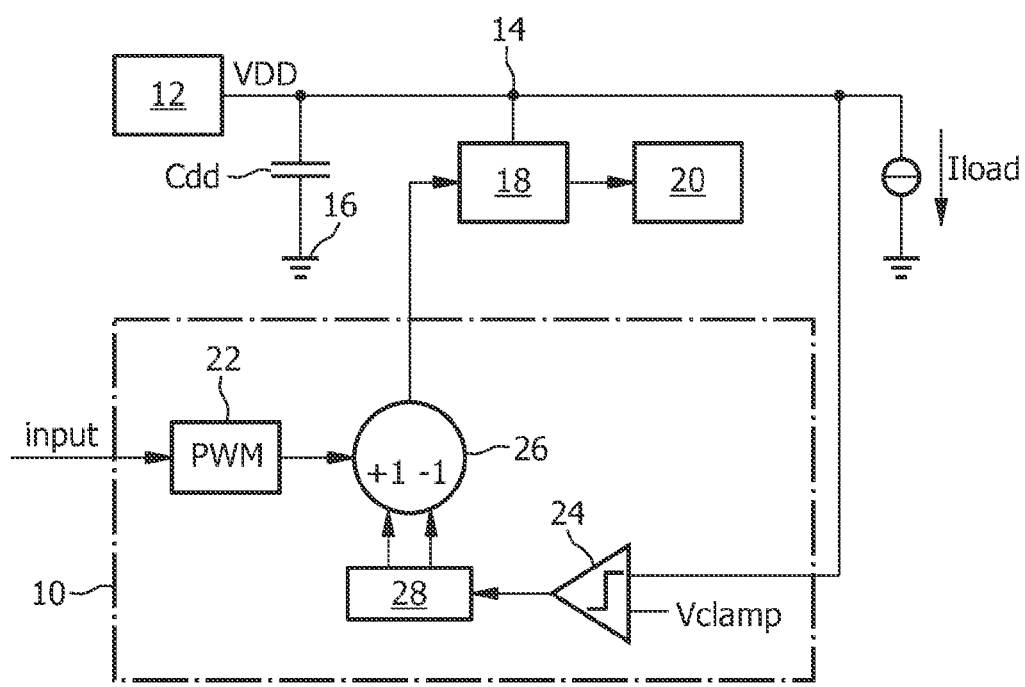
FIG. 3 shows a block diagram of a circuit using an embodiment of the controller in accordance with the invention and being suitable for performing the method in accordance with the present invention.

FIG. 3 shows a block diagram of a circuit using an embodiment of a controller 10 in accordance with the invention and being suitable for performing the method in accordance with the present invention. Besides the controller 10, which will be explained in detail later, the circuit comprises a power supply 12 having a power supply output 14. The power supply 12 is intended to provide at the power supply output 14 a constant voltage VDD. Between the power supply output 14 and ground 16 there is provided a decoupling capacitor $C_{dd}$. Furthermore, a bridge driver 18 coupled to the power supply output 14 is provided for driving a DC motor 20. The bridge driver 18 is controlled by the controller 10 which comprises means 22 in form of a PWM signal generator 22 for applying a deceleration PWM signal to the bridge driver 18. It should be clear that the PWM signal generator 22 can also be adapted to provide acceleration PWM signals, but such acceleration PWM signals are of lower interest for the present invention. The output of the PWM signal generator 22 is coupled to a PWM signal modifier 26 which is adapted to stepwise increase or decrease the pulse width of the PWM signal delivered by the PWM signal generator 22. The PWM signal modifier 26 is controlled by up/down filter 28 which samples the output signal of a comparator 24 which compares the voltage at the power supply output 14 to a predetermined voltage threshold $V_{clamp}$.

With the embodiment shown in FIG. 3 the method in accordance with the invention can be carried out as follows: First, the PWM signal generator 22 applies a deceleration PWM signal to the bridge driver 18 via PWM signal modifier 26 which in this situation is controlled by the comparator 24 to be inactive. Thereby, a process for decelerating the DC motor is started such that, due to a suitable PWM signal, a regenerative deceleration occurs. If an over-voltage, i.e. a voltage higher than the voltage threshold $V_{clamp}$, occurs at the power supply output 14, this is detected by the comparator 24. In such a case the comparator 24 controls the PWM signal modifier 26 to start decreasing the pulse width of the deceleration PWM signal (as mentioned above increasing the pulse width of the PWM deceleration signal would also be possible in view of the parabolic dependency). As soon as the voltage at the power supply output 14 drops below the voltage threshold $V_{clamp}$ the signal at the output of comparator 24 toggles, and this is detected by the up/down filter 28 which in turn causes the PWM signal modifier 26 to start changing the pulse width in the opposite direction, i.e. in the present example to increase the pulse width of the deceleration PWM signal. It is clear that the above decreasing and subsequent increasing of the pulse width can be repeated a plurality of times during a single deceleration process.

Figure 4:
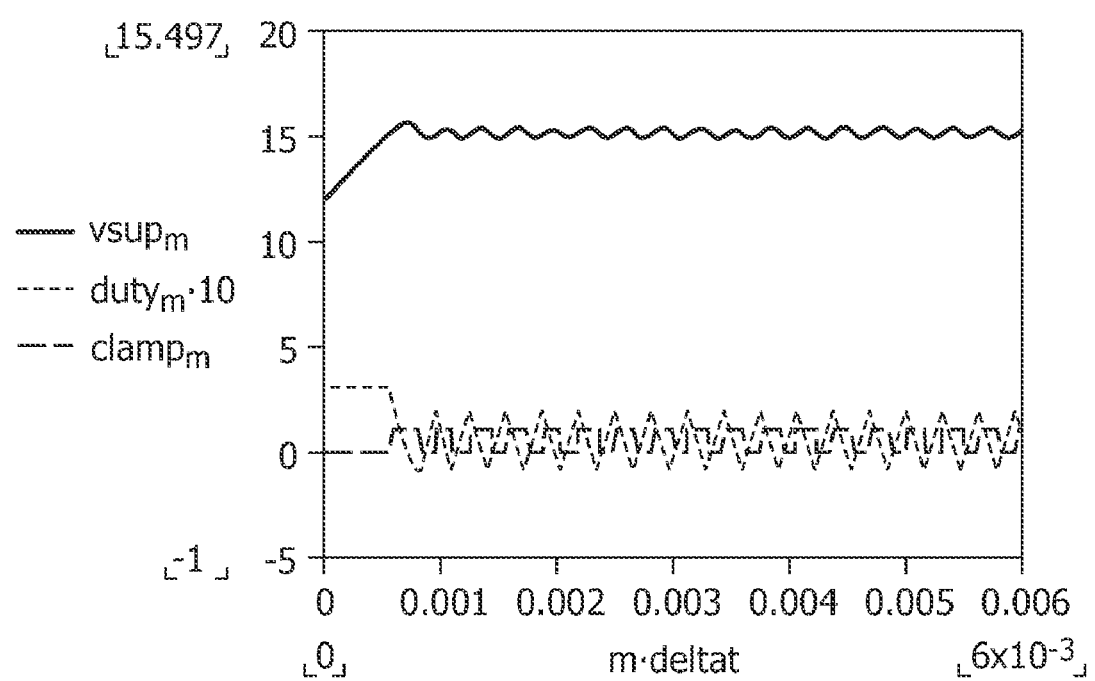
FIG. 4 shows a graph illustrating an example for supply voltage, PWM duty cycle and comparator output profiles obtained by applying the method of the present invention.

FIG. 4 shows a graph illustrating a possible operation of the circuit shown in FIG. 3, wherein $V_{DD}$=12 V, $C_{dd}$=100 µF, $V_{emf}$=8 V, R=2 Ohm (R is not explicitly shown, but is as discussed in connection with FIGS. 1a to 1c), $PWM_{input}$=30%, $I_{load}$=100 mA, $V_{clamp}$=15 V, duty cycle step=2%, and $f_{sample}$=100 kHz. When there is load current $I_{load}$ drawn from the supply that is smaller than the regenerative brake current (otherwise the supply voltage at the power supply output 14 would not rise), the result is a supply voltage $V_{sup}$ oscillating around $V_{clamp}$.

Figure 5:
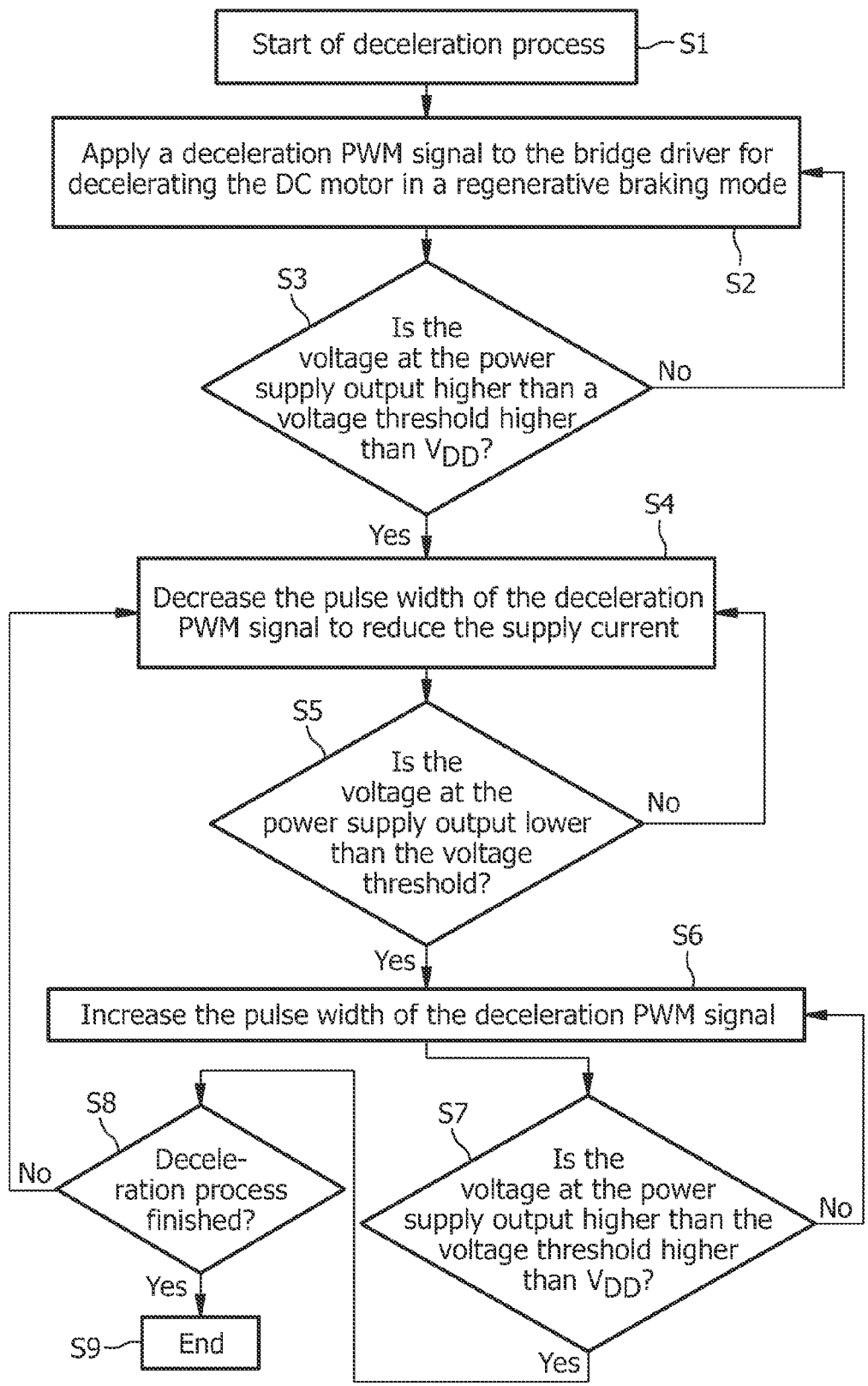
FIG. 5 shows a flowchart illustrating a more general embodiment of the method in accordance with the invention.

FIG. 5 shows a flowchart illustrating a more general embodiment of the method in accordance with the invention. In step S1 a regenerative deceleration process is started. For this reason in step S2 a suitable deceleration PWM signal is applied to the bridge driver for decelerating the DC motor in a regenerative braking mode. In step S3 it is checked whether the voltage at the power supply output is higher than the voltage threshold higher than VDD. If this is not the case, the method goes back to step S2, otherwise it continues with step S4 where the pulse width of the deceleration PWM signal is reduced. Then, it is checked in step S5 whether the voltage at the power supply output is already lower than the voltage threshold. If this is not the case, the method returns to step S4 and the pulse width is further reduced. Otherwise the method continues to step S6 where the pulse width of the deceleration PWM signal is increased. Subsequently, it is checked in step S7 whether the voltage at the power supply output is (again) higher than the voltage threshold. If this is not the case, the pulse width is further increased in step S6, otherwise the method continues to step S8 where it is checked whether the deceleration process is finished. If this is the case, the method ends in step S9, otherwise it goes back to step S4 where the pulse width is decreased again.

Finally, it is to be noted that equivalents and modifications not described above may also be employed without departing from the scope of the invention, which is defined in the accompanying claims.

The invention claimed is:

1. A method for controlling a deceleration process of a DC motor, wherein the DC motor is driven by a bridge driver coupled to a power supply intended to provide a supply voltage VDD at a power supply output, the method comprising the following steps:

applying a deceleration PWM signal to the bridge driver for decelerating the DC motor;

controlling the bridge driver such that a motor-induced back current is reduced, if the voltage at the power supply output exceeds a voltage threshold which is higher than VDD;

the method being characterized in that the step of controlling the bridge driver (18) such that a motor-induced back current is reduced, if the voltage at the power supply output (14) exceeds a voltage threshold which is higher than VDD comprises:

if the voltage at the power supply output exceeds the voltage threshold, changing stepwise the pulse width of the deceleration PWM signal in a first direction until the voltage at the power supply output reaches or falls below the voltage threshold, and then, if the voltage at the power supply output has fallen below the voltage threshold, changing stepwise the pulse width of the deceleration PWM signal in a second direction opposite to the first direction until the voltage at the power supply output (14) again reaches or exceeds the voltage threshold.

2. The method according to claim 1, wherein the voltage threshold is higher than VDD.

3. The method according to claim 1, wherein the pulse width of the deceleration PWM signal is kept constant, if the voltage at the power supply output is equal to the voltage threshold.

4. The method according to claim 1, wherein the pulse width of the PWM deceleration signal is selected such that the DC motor current experiences a change of sign compared to an acceleration process of the DC motor.

5. A controller for a DC motor which is driven by a bridge driver coupled to a power supply intended to provide a supply voltage VDD at a power supply output, the controller comprising:

means for applying a deceleration PWM signal to the bridge driver for decelerating the DC motor;

means for controlling the bridge driver such that the motor-induced back current is reduced, if the voltage at the power supply output exceeds a voltage threshold which is higher than VDD;

characterized in that the means for controlling the bridge driver are adapted to operate as follows: if the voltage at the power supply output exceeds the voltage threshold, changing stepwise the pulse width of the deceleration PWM signal in a first direction until the voltage at the power supply output reaches or falls below the voltage threshold, and then, if the voltage at the power supply output has fallen below the voltage threshold, changing stepwise the pulse width of the deceleration PWM signal in a second direction opposite to the first direction until the voltage at the power supply output again reaches or exceeds the voltage threshold.

6. The controller according to claim 5, wherein the voltage threshold is higher than VDD.

7. The controller according to claim 5, wherein the means for controlling the bridge driver are adapted to keep the pulse width of the deceleration PWM signal constant, if the voltage at the power supply output is equal to the voltage threshold.

8. The controller according to claim 5, wherein the means for applying a deceleration PWM signal to the bridge driver are adapted to select the pulse width of the PWM deceleration signal such that the DC motor current experiences a change of sign compared to an acceleration process of the DC motor.

* * * * *